United States Patent
Chandrasekhar et al.

(10) Patent No.: US 9,275,242 B1
(45) Date of Patent: Mar. 1, 2016

(54) SECURITY SYSTEM FOR CLOUD-BASED EMAILS

(71) Applicant: Trend Micro Incorporated, Tokyo (JP)

(72) Inventors: Bharath Kumar Chandrasekhar, Sunnyvale, CA (US); Yusong Zhang, San Jose, CA (US); Liang-seng Koh, Fremont, CA (US)

(73) Assignee: Trend Micro Incorporated, Tokyo (JP)

( * ) Notice: Subject to any disclaimer, the term of this patent is extended or adjusted under 35 U.S.C. 154(b) by 73 days.

(21) Appl. No.: 14/053,402

(22) Filed: Oct. 14, 2013

(51) Int. Cl.
*G06F 21/60* (2013.01)
*H04L 29/06* (2006.01)

(52) U.S. Cl.
CPC ............ *G06F 21/602* (2013.01); *G06F 21/606* (2013.01); *H04L 63/0281* (2013.01); *H04L 63/04* (2013.01)

(58) Field of Classification Search
CPC . G06F 21/606; G06F 21/602; H04L 63/0281; H04L 63/04
See application file for complete search history.

(56) References Cited

U.S. PATENT DOCUMENTS

| | | | |
|---|---|---|---|
| 5,991,399 | A | 11/1999 | Graunke et al. |
| 6,356,915 | B1 | 3/2002 | Chtchetkine et al. |
| 6,886,096 | B2 | 4/2005 | Appenzeller et al. |
| 7,003,117 | B2 | 2/2006 | Kacker et al. |
| 7,017,181 | B2 | 3/2006 | Spies et al. |
| 7,103,911 | B2 | 9/2006 | Spies et al. |
| 7,113,594 | B2 | 9/2006 | Boneh et al. |
| 7,266,847 | B2 | 9/2007 | Pauker et al. |
| 8,281,125 | B1 * | 10/2012 | Briceno .............. H04L 63/0428 707/741 |
| 2002/0143871 | A1 * | 10/2002 | Meyer .................. G06Q 10/107 709/204 |
| 2003/0069932 | A1 * | 4/2003 | Hall et al. ...................... 709/206 |
| 2004/0179684 | A1 | 9/2004 | Appenzeller et al. |
| 2004/0249892 | A1 * | 12/2004 | Barriga ................. H04L 12/583 709/206 |
| 2005/0188030 | A1 * | 8/2005 | Hudecek ....................... 709/206 |

(Continued)

FOREIGN PATENT DOCUMENTS

| | | |
|---|---|---|
| GB | 2 434 947 | 8/2007 |
| GB | 2 436 668 | 10/2007 |

(Continued)

OTHER PUBLICATIONS

IT Security Journal—Information Technology Security >> Ciphercloud interview, 2 sheets [retrieved on Oct. 5, 2013], retrieved from the internet: http://itsecurityjournal.com/tag/ciphercloud-interview/.

(Continued)

*Primary Examiner* — Robert Leung
(74) *Attorney, Agent, or Firm* — Okamoto & Benedicto LLP

(57) ABSTRACT

A cloud-based email system is accessed by way of a cloud access security system. The cloud access security system allows for encryption of incoming emails and outgoing emails stored in the cloud-based email system. The cloud access security system includes a protocol proxy for providing an interface between a client computer of a user and the cloud-based email system, an encryption module for indexing and encrypting emails, and an event listener for receiving email event notifications from the cloud-based email system and replacing emails with corresponding encrypted emails. The cloud access security system may receive encryption keys from a key manager hosted by a key server, which may be part of the cloud access security system or hosted on premise in the same private computer network as client computers employed by users.

20 Claims, 10 Drawing Sheets

(56) References Cited

U.S. PATENT DOCUMENTS

| | | | |
|---|---|---|---|
| 2006/0080702 | A1 | 4/2006 | Diez et al. |
| 2006/0224681 | A1* | 10/2006 | Wurster .................. 709/206 |
| 2008/0114761 | A1* | 5/2008 | Gross et al. .................. 707/6 |
| 2008/0134316 | A1 | 6/2008 | Devonshire et al. |
| 2009/0328164 | A1 | 12/2009 | Sunder et al. |
| 2010/0100815 | A1* | 4/2010 | Hutchinson ......... G06F 17/2229 715/256 |
| 2010/0169948 | A1 | 7/2010 | Budko et al. |
| 2011/0173438 | A1 | 7/2011 | Matzkel |
| 2011/0264907 | A1* | 10/2011 | Betz .................. H04L 63/0428 713/153 |
| 2012/0278621 | A1* | 11/2012 | Woloszyn .......... H04L 61/2596 713/168 |
| 2013/0326218 | A1* | 12/2013 | Burch et al. .................. 713/168 |
| 2014/0019497 | A1* | 1/2014 | Cidon et al. .................. 707/827 |
| 2014/0095860 | A1* | 4/2014 | Shikfa .................. H04L 9/008 713/150 |

FOREIGN PATENT DOCUMENTS

| | | |
|---|---|---|
| GB | 2 436 910 | 10/2007 |
| WO | 2007088337 | 8/2007 |
| WO | 2007110598 | 10/2007 |

OTHER PUBLICATIONS

Vaultive—Exhange / Office 365 Encryption—Ownership & Control of Data in the Cloud, 2 sheets [retrieved on Oct. 5, 2013], retrieved from the internet: http://www.vaultive.com/.

CipherCloud Offers Military-Grade Encryption / Cloud Computing Journal, 2 sheets [retrieve on Oct. 5, 2013], retrieved from the internet: http://cloudcomputing.sys-con.com/node/2453422.

Amazon Web Services Developer Community: S3 Encryption, posted on Jun. 10, 2009 (1 sheet).

Amazon Web Services: Introducing Amazon Virtual Private Cloud, 1 sheet [retrieved on Aug. 27, 2009], retrieved from the internet: http://aws.amazon.com/.

Extern blog SensePost;—Blackhat presentation demo vids: Summary, Aug. 2009, 2 sheets.

Rational Survivability: The Big Four Cloud Computing Providers: Security Compared (Part I), Nov. 26, 2008, 3 sheets.

Cloud Computing, Cloud Hosting & Online Storage by Rackspace Hosting, 4 sheets [retrieved on Aug. 27, 2009], retrieved from the Internet: http://www.rackspacecloud.com/.

Saied Hosseini Khayat, "Using Communication Encryption to Share a Secret" Aug. 18, 2008, pp. 1-6, Electrical Engineering Dept., Ferdowsi University of Mashhad, Iran.

* cited by examiner

SECURITY SYSTEM FOR CLOUD-BASED EMAILS

BACKGROUND OF THE INVENTION

1. Field of the Invention

The present invention relates generally to computer security, and more particularly but not exclusively to systems and methods for securing cloud-based emails.

2. Description of the Background Art

Cloud-based email systems allow email users to send and receive emails without having to host and maintain their own email server. Examples of cloud-based email systems include the Microsoft Office 365™ email server and the Google Mail™ email server. A cloud-based email system is in the cloud in that it is employed over a computer network, such as the Internet. More particularly, a user may communicate with the cloud-based email system to send and receive emails over the Internet.

Although cloud-based email systems provide numerous advantages over on-premise, self-maintained email servers, cloud-based email systems are provided by a third-party and thus raise security and privacy concerns. In particular, potential users are concerned that emails stored in a cloud-based email system are accessible to the cloud-based email system provider and may be readily provided to other parties, such as in response to a subpoena, for example.

SUMMARY

In one embodiment, a cloud-based email system is accessed by way of a cloud access security system. The cloud access security system allows for encryption of incoming emails and outgoing emails stored in the cloud-based email system. The cloud access security system may include a protocol proxy for providing an interface between a client computer of a user and the cloud-based email system, an encryption module for indexing and encrypting emails, and an event listener for receiving email event notifications from the cloud-based email system and replacing emails with corresponding encrypted emails. The cloud access security system may receive encryption keys from a key manager hosted by a key server, which may be part of the cloud access security system or hosted on premise in the same private computer network as client computers employed by users.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
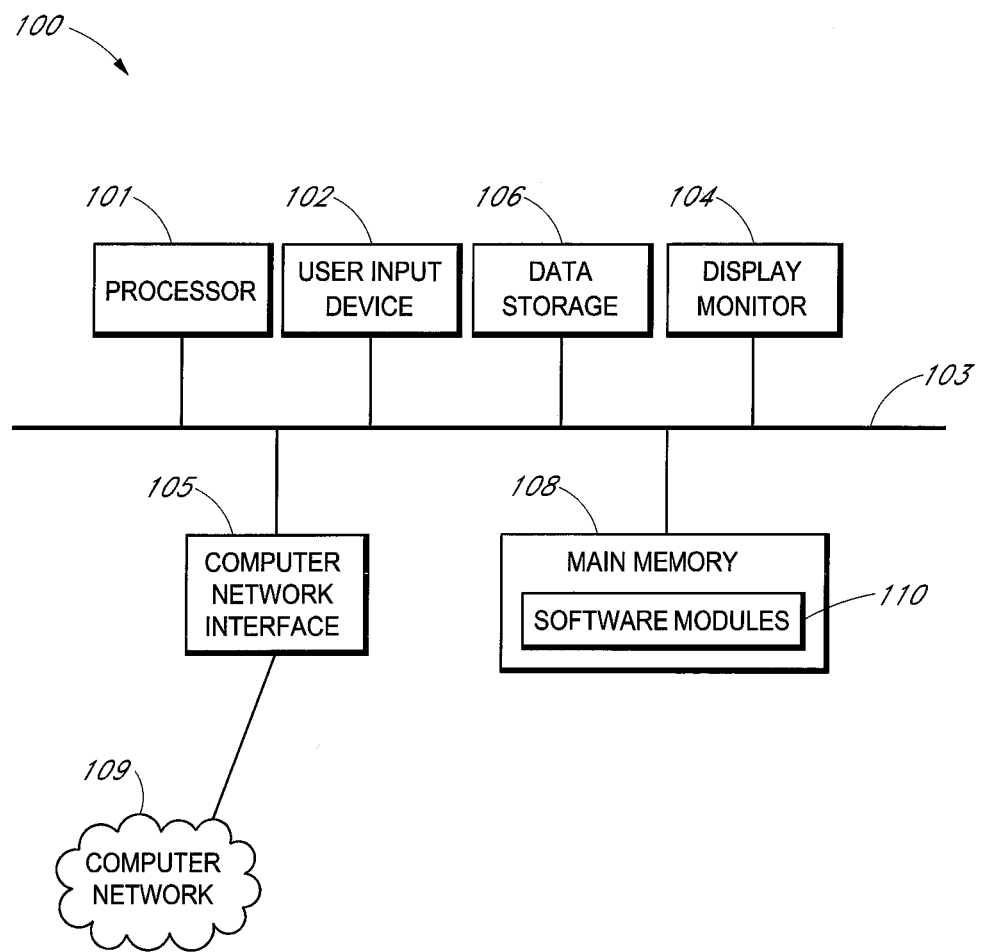
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a client computer or one of the computers of a cloud access security system, for example. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise protocol proxies, a data indexer, a cryptography component, and an encryptor when the computer 100 is employed as part of a cloud access security system.

The computer 100 may be configured to perform its functions by executing the software modules 110. The software modules 110 may be loaded from the data storage device 106 to the main memory 108. An article of manufacture may be embodied as computer-readable storage medium including instructions that when executed by a computer causes the computer to be operable to perform the functions of the software modules 110.

Figure 2:
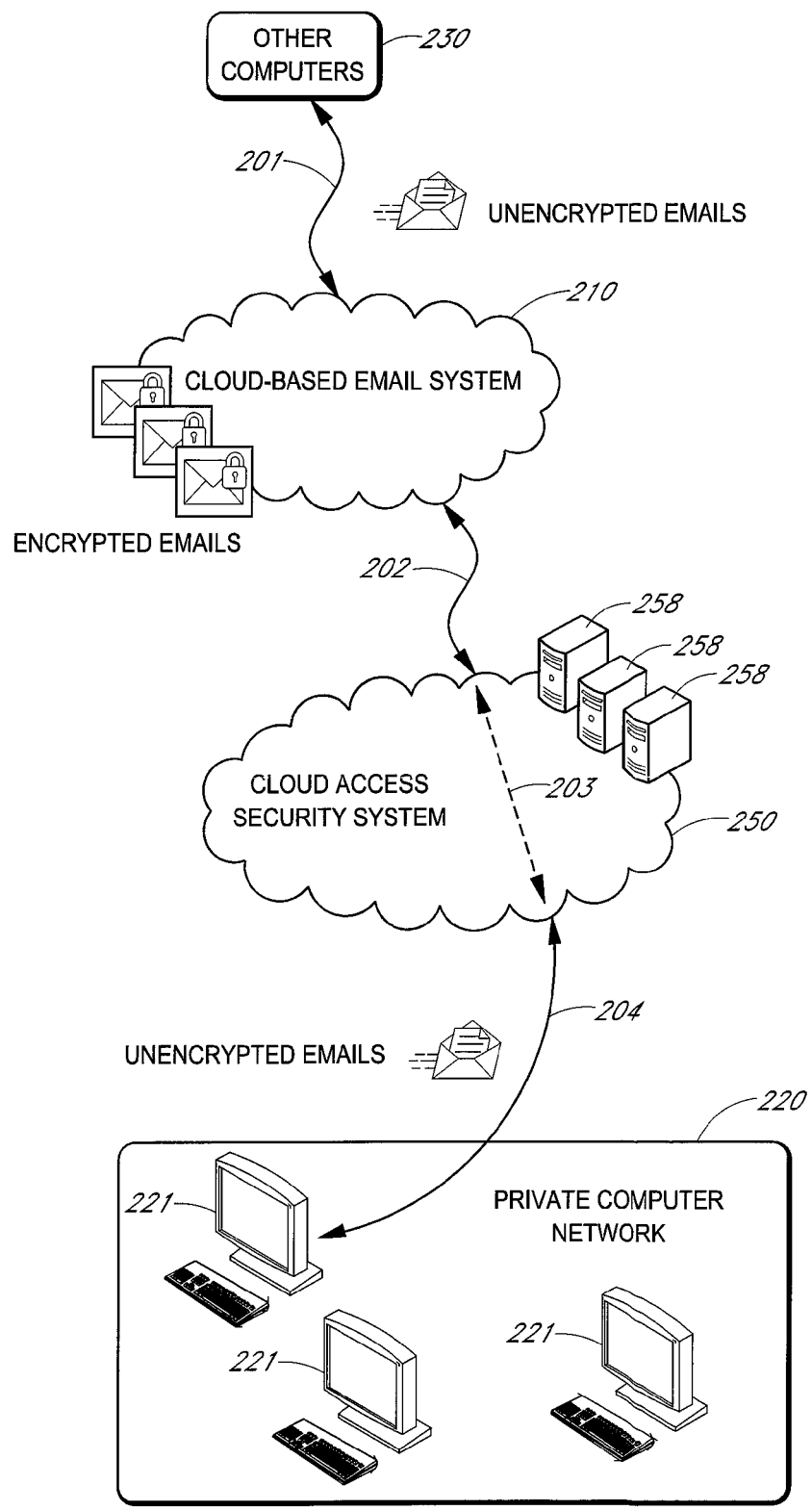
FIG. 2 shows a schematic diagram of a system for securing cloud-based emails in accordance with an embodiment of the present invention.

FIG. 2 shows a schematic diagram of a system for securing cloud-based emails in accordance with an embodiment of the present invention. In the example of FIG. 2, the system comprises a cloud-based email system 210, one or more client computers 221, and a cloud access security system 250. The cloud-based email system 210 may comprise a commercially available cloud-based email system, such as the Microsoft Office 365™ email server and the Google Mail™ email server, for example. Users of the private computer network 220 may maintain email accounts, which are commonly referred to as "mailboxes," in the cloud-based email system 210. Emails stored in the cloud-based email system 210 for users of the private computer network 220 may be encrypted by the cloud access security system 250 in a seamless and transparent manner to preserve the original user-experience provided by cloud-based email system 210. The cloud-based email system 210 may communicate with other computers 230 (see arrow 201) to receive incoming emails for a user and to forward outgoing emails sent by the user.

A client computer 221 may comprise a computer employed by a user to access the cloud-based email system 210. The client computer 221 may comprise a desktop computer, a laptop computer, a smartphone, or a mobile computing device (e.g., a tablet), for example. In the example of FIG. 2, the client computers 221 are part of a private computer network 220, such as a computer network maintained and operated by an enterprise. In the example of FIG. 2, the private computer network 220 does not have an on-premises email server. Instead, the private computer network 220 provides email services using the cloud-based email system 210, which is owned and operated by a third-party, i.e., not associated with the private computer network 220. In other embodiments, the client computers 221 are part of a public computer network.

The cloud access security system 250 may comprise one or more computers 258 that secure emails stored in the cloud-based email system 210. In one embodiment, the cloud access security system 250 indexes unencrypted emails in an index, replaces unencrypted emails stored in the cloud-based email system 210 with encrypted emails, and provides the client computers 221 an interface for accessing the cloud-based email system 210. In one embodiment, the cloud access security system 250 receives all email communications between the cloud-based email system 210 and the client computers 221 (see arrow 203). The cloud access security system 250, the cloud-based email system 210, and the client computers 221 may communicate over the Internet.

In the example of FIG. 2, the cloud access security system 250 forwards and receives emails to and from client computers 221 of the private computer network 220 (see arrow 204). In one embodiment, the emails transferred between the client computers 221 and the cloud access security system 250 and emails transferred between the cloud-based email system 210 and other computers 230 are unencrypted. However, as will be more apparent below, the cloud access security system 250 simply provides another layer of encryption that is transparent to the cloud-based email system 210, the client computers 221, and the other computers 230 when the emails are encrypted by some other system. In this disclosure, an "email" has not been encrypted by the cloud access security system 250 unless specifically noted or referred to as an "encrypted email" (e.g., "encrypted outgoing email", "encrypted incoming email").

The cloud access security system 250 may detect reception of an incoming email in the cloud-based email system 210, with the incoming email being sent by another computer 230 (e.g., an email server computer) to a user of a client computer 221. The cloud access security system 250 may retrieve the incoming email from the cloud-based email system 210 (e.g., a copy in the inbox of the user's mailbox), encrypt the incoming email to generate an encrypted incoming email, and replace the incoming email with its corresponding encrypted incoming email in the cloud-based email system 210. When the client computer 221 requests to receive the incoming email, the cloud access security system 250 may retrieve the corresponding encrypted incoming email from the cloud-based email system 210, decrypt the encrypted incoming email back to the incoming email, and provide the incoming email to the client computer 221.

The cloud access security system 250 may receive a search request for particular emails from the client computer 221, identify encrypted emails stored in the cloud-based email system 210 and responsive to the search request, retrieve the identified encrypted emails from the cloud-based email system 210, decrypt the identified encrypted emails to decrypted emails, and provide the decrypted emails to the client computer 221 as search results responsive to the search request.

The cloud access security system 250 may receive an outgoing email to be sent by the client computer 221 to the other computer 230, forward the outgoing email to the cloud-based email system 210 for forwarding to the other computer 230, retrieve the outgoing email stored in the cloud-based email system 210 (e.g., a copy in the sent folder of the user's mailbox), encrypt the outgoing email to generate a corresponding encrypted outgoing email, and replace the outgoing email stored in the cloud-based email system 210 with its corresponding encrypted outgoing email.

In the example of FIG. 2, the cloud access security system 250 communicates with the cloud-based email system 210 (see arrow 202) to forward and receive emails, to receive email event notifications, and to replace unencrypted emails stored in the cloud-based email system 210 with encrypted emails.

Figure 3:
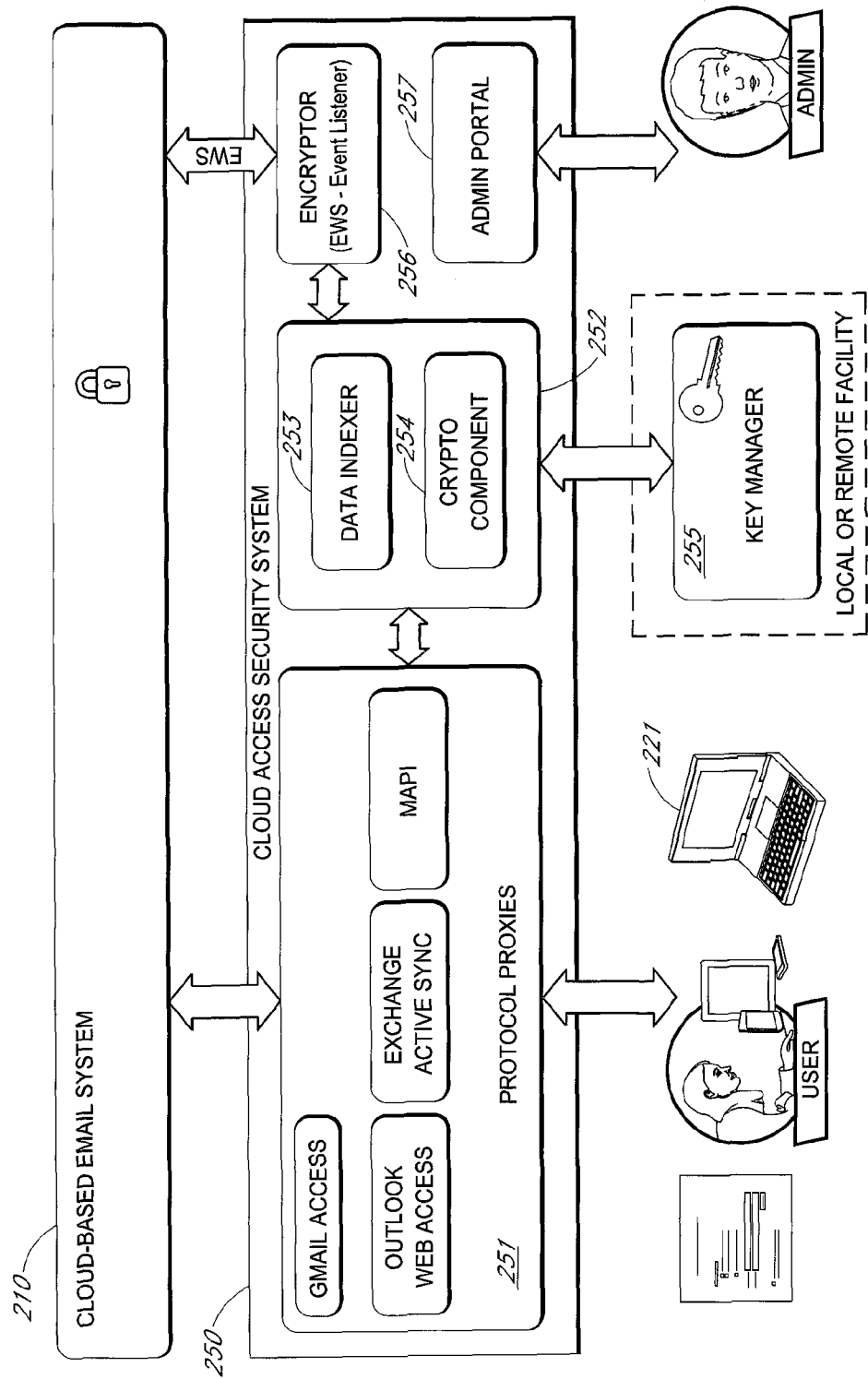
FIG. 3 shows a schematic diagram of a cloud access security system in accordance with an embodiment of the present invention.

FIG. 3 shows a schematic diagram of a cloud access security system in accordance with an embodiment. In the example of FIG. 3, the cloud access security system 250 comprises one or more protocol proxies 251, an encryption module 252, an event listener 256, and an administration portal 257. The components of the cloud access security system 250 may be implemented in software as computer-readable program code, in hardware as programmed logic and other electrical circuits, or in a combination of both hardware and software. In one embodiment, the aforementioned components of the cloud access security system 250 are implemented in software running on one or more computers.

In one embodiment, a protocol proxy 251 comprises computer-readable program code for monitoring and processing email communications between a client computer 221 and the cloud-based email system 210. In one embodiment, all email communications between a client computer 221 and the cloud-based email system 210 pass through, and are thereby received by, a protocol proxy 251. The particular protocol proxy 251 that receives and processes email communications depend on the email communication protocol of the cloud-based email system 210 and the client computer 221. For example, a protocol proxy 251 may comprise a proxy for the Microsoft Outlook Web Access™ protocol, the Microsoft Exchange ActiveSync™ protocol, the Messaging Application Programming Interface (MAPI) protocol, the Microsoft Exchange Web Services™ (EWS) protocol, a protocol for accessing the Google Gmail™ email server, etc. As a particular example, a protocol proxy 251 may comprise a proxy for the Microsoft Exchange ActiveSync™ protocol when the cloud-based email system 210 and the client computer 221 communicates in accordance with the Microsoft Exchange ActiveSync™ protocol.

In one embodiment, a protocol proxy 251 processes email communications between the cloud-based email system 210 and the client computer 221 to provide a seamless and transparent encryption service for emails stored in the cloud-based email system 210. A protocol proxy 251 receives email communications between the cloud-based email system 210 and the client computer 221 and interprets the email communications in accordance with the email communication protocol employed. The protocol proxy 251 may process the email communications to pass through outgoing emails (i.e., emails sent by a user of the client computer 221) to the cloud-based email system 210 for forwarding to recipients and to allow for decryption of encrypted emails stored in the cloud-based email system 210 and being accessed by the client computer 221, such as encrypted incoming emails (i.e., emails addressed to the user of the client computer 221) and stored emails (e.g., emails in sent folder, inbox, etc.) being searched by the user of the client computer 221.

In one embodiment, the encryption module 252 comprises a data indexer 253 and a cryptography component 254. The data indexer 253 may comprise computer-readable program code for indexing emails. The data indexer 253 may create an index for individual mailboxes in the cloud-based email system 210, with the index comprising the searchable components of emails and identification of encrypted versions of the emails. The index may be consulted to identify encrypted emails that meet particular search criteria.

The data indexer 253 may index an email for identification, searching, and location. In one embodiment, the data indexer 253 receives an email and indexes the email by storing the contents of the email that are typically searched by a user, such as message body, recipients, sender, attachments, etc. The data indexer 253 indexes emails in their unencrypted state, i.e., emails that have not been encrypted by the cryptography component 254. The data indexer 253 stores the searchable contents of the email in a compact format for relatively fast searching and low storage consumption, such as by removing non-essential data of the email, e.g., spaces, articles, commonly used English (or other language) words, etc. After the email has been encrypted by the cryptography component 254, the data indexer 253 also indexes the email by keeping track of the corresponding encrypted version of the email, such as by mapping the encrypted and unencrypted versions of the email by their common message identifier (ID). This allows for email search by consulting the index to identify the emails that meet search criteria, and then identifying the corresponding encrypted emails stored in the cloud-based email system 210 for retrieval. As can be appreciated, because emails stored in the cloud-based email system 210 have been encrypted by the cryptography component 254, emails in the cloud-based email system 210 cannot be readily searched. The data indexer 253 thus advantageously allows for searching of encrypted emails stored in the cloud-based email system 210. The data indexer 253 may be implemented using the open source Solr indexer, for example.

In one embodiment, the cryptography component 254 comprises computer-readable program code for encrypting emails and decrypting encrypted emails. The cryptography component 254 (or another component of the encryption module 252) may mark emails it encrypted to identify them as having been encrypted by the encryption module 252. In one embodiment, the cryptography component 254 only encrypts the user portions of the email, such as the message body and attachments, and other portions of the email that does not adversely affect format compatibility with the cloud-based email system. More specifically, the cryptography component 254 may preserve the formatting of the email to maintain compatibility with the cloud-based email system 210. For example, when the cloud-based email system 210 comprises the Microsoft Office 365™ email server, the cryptography component 254 may encrypt the email's text message body, subject field, and attachment, without encrypting the headers (e.g., recipient and sender information) and item formatting. The email subject field and message body may be encrypted using separate techniques to support "group by subject" functionality of some cloud-based email systems. The cryptography component 254 may encrypt an email into an encrypted email, and decrypt the encrypted email back to the unencrypted email. The cryptography component 254 may use different cryptography seeds for different emails of the same user for improved security, such as to prevent frequency analysis attacks. In one embodiment, the cryptography component 254 employs the AES-256 (Advanced Encryption Standard) encryption algorithm to encrypt emails and decrypt encrypted emails. Other encryption algorithms may also be employed without detracting from the merits of the present invention.

In one embodiment, encryption keys for encrypting emails and decrypting encrypted emails are received by the cryptography component 254 from a key manager 255. The key manager 255 may comprise a key server running on one or more computers. In one embodiment, the key manager 255 is part of the cloud access security system 250. In other embodiments, for more control of access to the emails, the key manager 255 may be hosted on-premise, i.e., within the private computer network 220 (see FIG. 2) that includes the client computer 221.

In one embodiment, the event listener 256 comprises computer-readable program code for communicating with the cloud-based email system 210. In one embodiment, the event listener 256 receives email event notifications from the cloud-based email system 210 and issues email processing requests to the cloud-based email system 210. The event listener 256 may register with the cloud-based email system 210 to receive email event notifications for particular mailboxes, such as notifications when a mailbox receives an incoming email and sends an outgoing email. The event listener 256 may communicate with the cloud-based email system 210 using a protocol recognized by the cloud-based email system 210. For example, the event listener 256 may communicate with the cloud-based email system 210 in accordance with the Microsoft Exchange Web Services™ protocol when the cloud-based email system 210 comprises the Microsoft Office 365™ email server.

In one embodiment, the administration portal 257 comprises computer-readable program code for allowing an administrator, such as Information Technology (IT) personnel, to configure the cloud access security system 210. For example, the administrator may log onto the cloud access security system 210 by way of the portal 257 to enter particulars for mailboxes that will be provided encryption service. As a particular example, when the cloud-based email system 210 comprises the Microsoft Office 365™ email server, a user's mailbox will have a corresponding service account information that identifies the mailbox and provides access privileges (e.g., replacement of emails in the mailbox) to the mailbox. An administrator may log onto the administration portal 257 to provide service account information for a user's mailbox to the event listener 256, which uses the service account information to register with the cloud-based email system 210 to receive email event notifications to gain access privileges to the mailbox.

FIGS. 4-9 show flow diagrams that schematically illustrate example operations of a cloud access security system in accordance with an embodiment of the present invention. In the example of FIGS. 4-9, the cloud-based email system 210 comprises the Microsoft Office 365™ email server, the protocol proxy 251 comprises a proxy for the Microsoft Exchange Active Sync™ protocol, and the event listener 256 communicates with the cloud-based email system 210 in accordance with the Microsoft Exchange Web Services™ protocol. As can be appreciated other cloud-based email systems and corresponding protocols may also be employed without detracting from the merits of the present invention. Furthermore, the example operations depict a single mailbox for a user of a client computer 221. As can be appreciated, embodiments of the present invention are typically employed to service a plurality of users, with each user having his or her own mailbox. The client computer 221 is configured to connect to the cloud access security system 250, instead of directly to the cloud-based email system 210, when accessing the cloud-based email system 210. For example, the configuration of the client computer 221 may be modified so that it points to the cloud access security system 250, instead of to the cloud-based email system 210, when accessing the cloud-based email system 210. As a particular example, assuming the user has been given the address of "abc-org.onmicrosoft.com" to access his mailbox in the cloud-based email system 210, the client computer 221 may instead be pointed to the address "abc-org.trendmicro.com", which is the address of the cloud access security system 250 for the user. As another example, the user may register a custom email domain and point the domain name service (DNS) A record, i.e., host record, of that custom domain to the user's cloud access security system 250 address. In that example, the client computer 221 is configured to point to the custom domain name to access the cloud-based email system 210.

Figure 4:
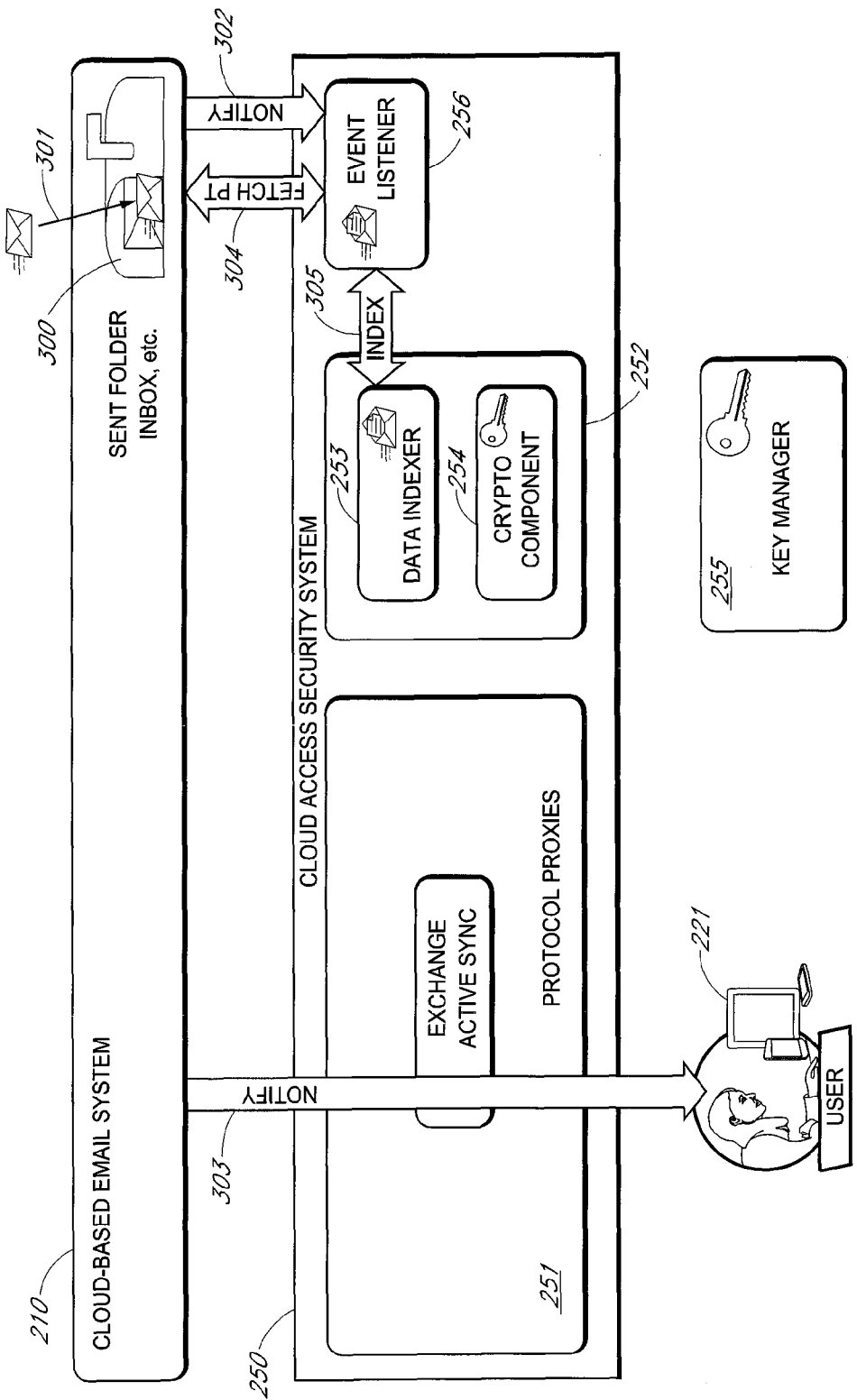
FIGS. 4-9 show flow diagrams that schematically illustrate example operations of a cloud access security system in accordance with an embodiment of the present invention.
Figure 5:
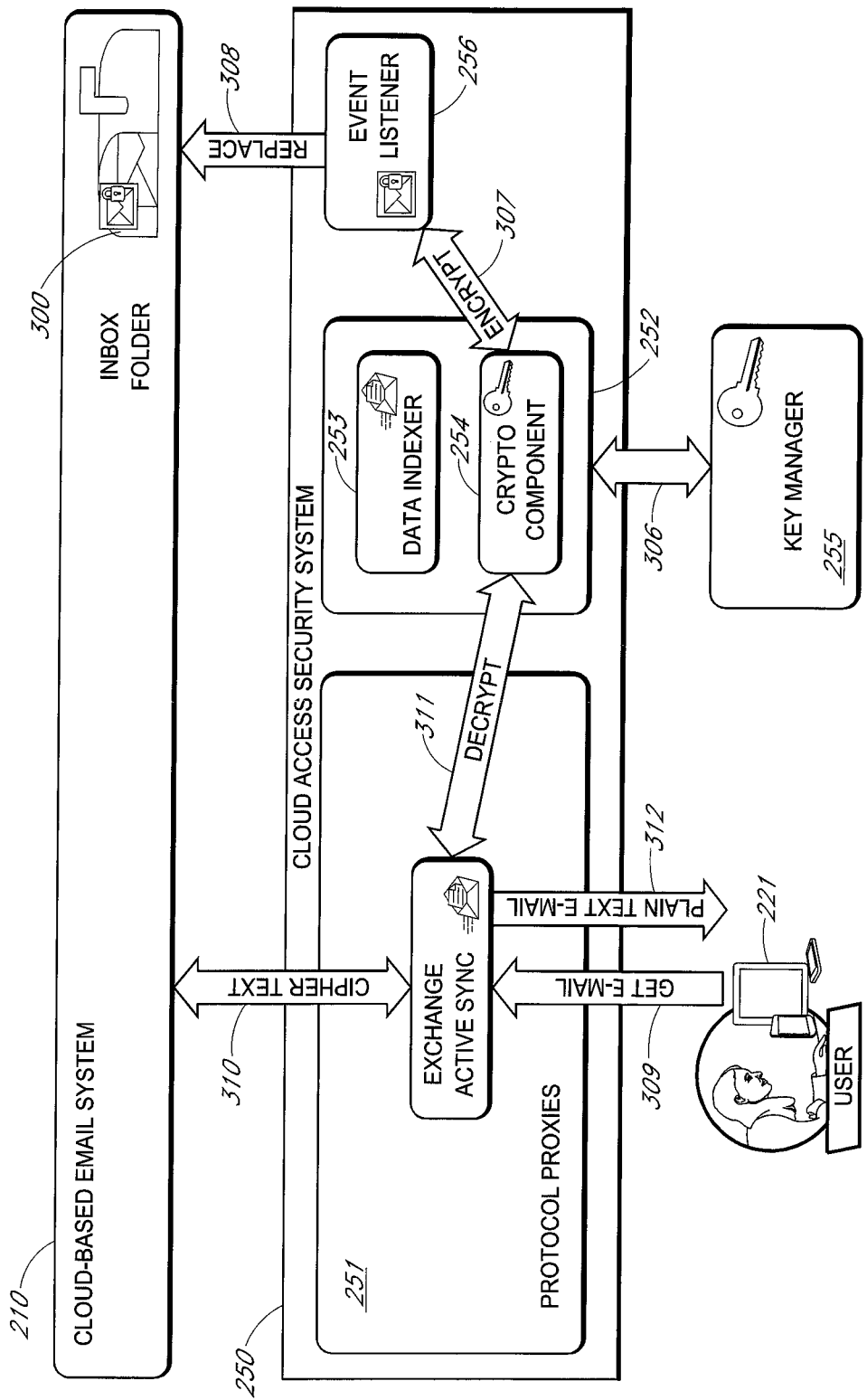

Referring first to FIGS. 4 and 5, there is shown a flow diagram that schematically illustrates processing of an incoming email for a mailbox in accordance with an embodiment of the present invention. In the example of FIGS. 4 and 5, the incoming email is received in the cloud-based email system 210 (see FIG. 4, arrow 301), with the incoming email being addressed to a user having a corresponding mailbox 300 in the cloud-based email system 210. Accordingly, the incoming email is received in the mailbox 300 of the user. The incoming email may be found in the inbox of the mailbox 300, for example.

In the following examples, the event listener 256 has registered with the cloud-based email system 210 to receive notifications whenever a new incoming email is received in the mailbox 300. Accordingly, as shown in FIG. 4, the cloud-based email system 210 notifies the event listener 256 when the incoming email is first received in the mailbox 300 (see arrow 302). The cloud-based email system 210 may also send a separate notification to the client computer 221 of the user (see arrow 303), informing the user that there is a new incoming email in his mailbox 300. The notification for the user is received by the protocol proxy 251, which forwards the notification to the client computer 221 of the user.

In response to receiving the notification that a new incoming email has been received in the mailbox 300, the event listener 256 retrieves the incoming email from the cloud-based email system 210 (see arrow 304). For example, the event listener 256 may request the cloud-based email system 210 to receive a copy of the incoming email (or individual contents of the incoming email, such as message body, subject, etc.) from the inbox of the mailbox 300. The event listener 256 receives the incoming email from the cloud-based email system 210 and forwards the incoming email to the encryption module 252. There, the data indexer 253 receives and indexes the incoming email (see arrow 304) in its unencrypted state, i.e., not encrypted by the cryptography component 254. The data indexer 253 indexes the incoming email in its unencrypted, typically clear text state to allow for subsequent searching.

Continuing in FIG. 5, the encryption module 252 requests and receives an encryption key from the key manager 255 (see arrow 306). The event listener 256 receives the incoming email from the event listener 256, encrypts the incoming email using the encryption key received from the key manager 255, and provides the resulting encrypted incoming email to the event listener 256 (see arrow 307). Upon receiving the encrypted incoming email, the event listener 256 replaces a copy of the incoming email stored in the mailbox 300 (e.g., in the inbox of the user) with the encrypted incoming email (see arrow 308). For example, the event listener 256 may delete the incoming email stored in the mailbox 300 and replace that deleted incoming email with the corresponding encrypted incoming email. As can be appreciated, the deletion and replacement of the incoming email may be performed in the same step. Accordingly, the mailbox 300 now only has an encrypted version of the incoming email. This advantageously protects against unauthorized viewing of the incoming email as stored in the cloud-based email system 210.

In response to receiving the notification of arrival of the incoming email, the user of the client computer 221 may decide to retrieve the incoming email. For example, the client computer 221 may request the cloud-based email system 210 to provide the incoming email to the client computer 221 (see arrow 309). The protocol proxy 251 receives the request for the incoming email, identifies the request as a request for the incoming email, and forwards the request to the cloud-based email system 210 (see arrow 310). In response to receiving the request, the cloud-based email system 210 retrieves the now encrypted incoming email, and forwards the encrypted incoming email to the client computer 221 (see arrow 310). The protocol proxy 251 receives the encrypted incoming email, detects that the encrypted incoming email is in a format encrypted by the encryption module 252 (e.g., by checking for a mark placed by the encryption module 252 on emails it encrypted), and accordingly proceeds to facilitate decryption of the encrypted incoming email (see arrow 311). For example, in response to detecting that the incoming email is in a format encrypted by the encryption module 252, the protocol proxy 251 may forward the encrypted incoming email to the cryptography component 254. The cryptography component 254 decrypts the encrypted incoming email back to the incoming email using an associated encryption key received from the key manager 255. The cryptography component 254 returns the incoming email, which has been decrypted, to the protocol proxy 251 (see arrow 311). The protocol proxy 251 provides the incoming email, which is typically in clear text now that it has been decrypted, to the client computer 221 (see arrow 312).

As can be appreciated, incoming emails are encrypted as stored in the mailbox 300 of the user. The encrypted incoming emails are decrypted before they are provided to the client computer 221. The encryption and decryption processes are performed in seamless, transparent fashion to minimize disruption to the user experience of working with the cloud-based email system 210. It is to be noted that a race condition may occur when the client computer 221 receives the incoming email before the cloud access security system 250 replaces the incoming email with its corresponding encrypted email. However, there is a very short window of time when this can occur and only the user's client computer 221 will receive the incoming email during that time.

Figure 6:
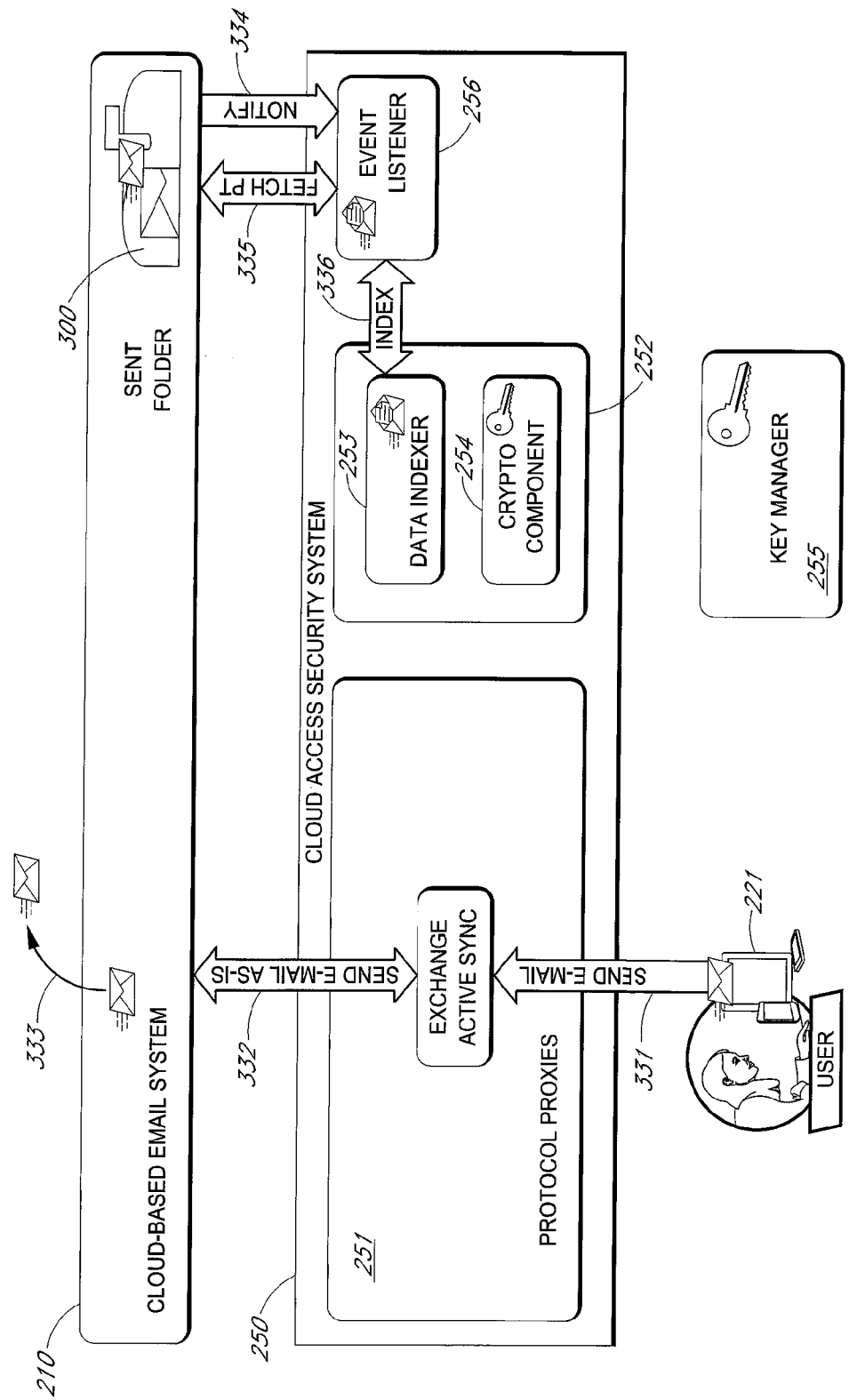
Figure 7:
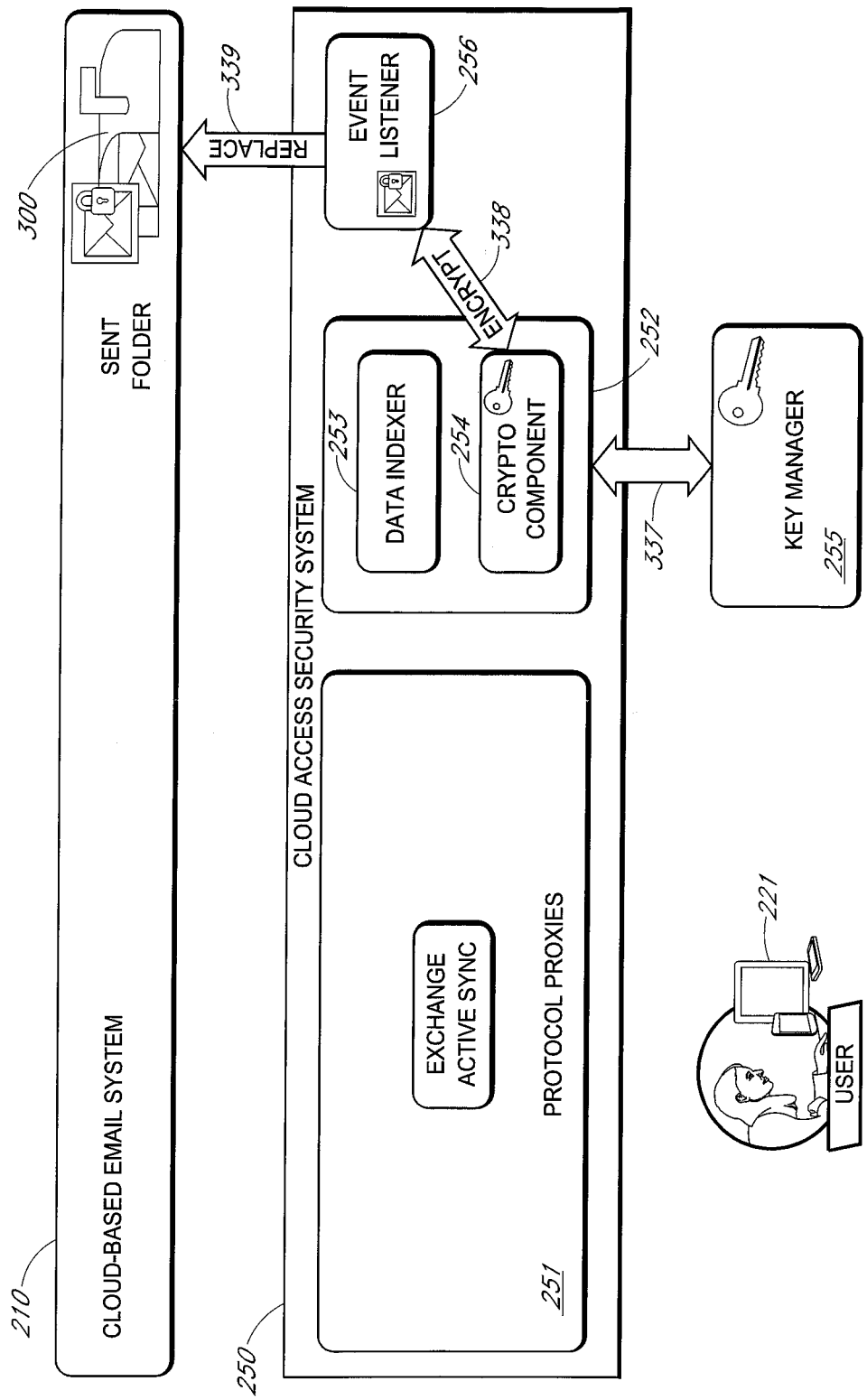

FIGS. 6 and 7 show a flow diagram that schematically illustrates processing of an outgoing email in accordance with an embodiment of the present invention. The flow diagram of FIGS. 6 and 7 may follow the flow diagram of FIGS. 4 and 5 when the user of the client computer 221 sends an outgoing email to another computer over the Internet, for example.

In the example of FIG. 6, the client computer 221 sends out an outgoing email (see arrow 331). The protocol proxy 251 receives the outgoing email. In response to detecting that the email is outgoing, the protocol proxy 251 forwards the outgoing email to the cloud-based email system 210 (see arrow 332). The protocol proxy 251 may pass through the outgoing email without modification. The cloud-based email system 210 receives the outgoing email and forwards the outgoing email to its destination (see arrow 333). The cloud-based email system 210 stores a copy of the outgoing email in the sent folder of the mailbox 300.

Having registered with the cloud-based email system 210 to receive email event notifications, the event listener 256 receives a notification from the cloud-based email system that an outgoing email has been sent by the owner of the mailbox 300, i.e., the user of the client computer 221 (see arrow 334). In response to receiving the notification, the event listener 256 retrieves the outgoing email from the cloud-based email system 210 (see arrow 335). For example, the event listener 256 may request the cloud-based email system 210 to receive a copy of the outgoing email from the sent folder of the mailbox 300. The event listener 256 receives the outgoing email from the cloud-based email system 210 and forwards the outgoing email to the encryption module 252. There, the data indexer 253 receives and indexes the outgoing email (see arrow 336). The data indexer 253 indexes the outgoing email in its unencrypted, typically clear text state to allow for subsequent searching.

Continuing in FIG. 7, the cryptography component 254 requests and receives an encryption key from the key manager 255 (see arrow 337). The event listener 256 receives the outgoing email from the event listener 256, encrypts the outgoing email using the encryption key received from the key manager 255, and provides the resulting encrypted outgoing email to the event listener 256 (see arrow 338). Upon receiving the encrypted outgoing email, the event listener 256 replaces a copy of the outgoing email stored in the mailbox 300 (e.g., in the sent folder of the mailbox 300) with the encrypted outgoing email (see arrow 308). For example, the event listener 256 may delete the outgoing email stored in the mailbox 300 and replace that deleted outgoing email with the corresponding encrypted outgoing email. Accordingly, the mailbox 300 now only has an encrypted version of the outgoing email, thereby protecting the outgoing email as stored in the cloud-based email system 210. The user may obtain and read the outgoing email in its unencrypted form by requesting for the outgoing email, and the cloud access security system receiving the corresponding encrypted outgoing email, decrypting the encrypted outgoing email back to the outgoing email, and providing the outgoing email to the client computer 221 in a similar manner performed for encrypted incoming emails (see FIG. 5, arrows 309-312).

Figure 8:
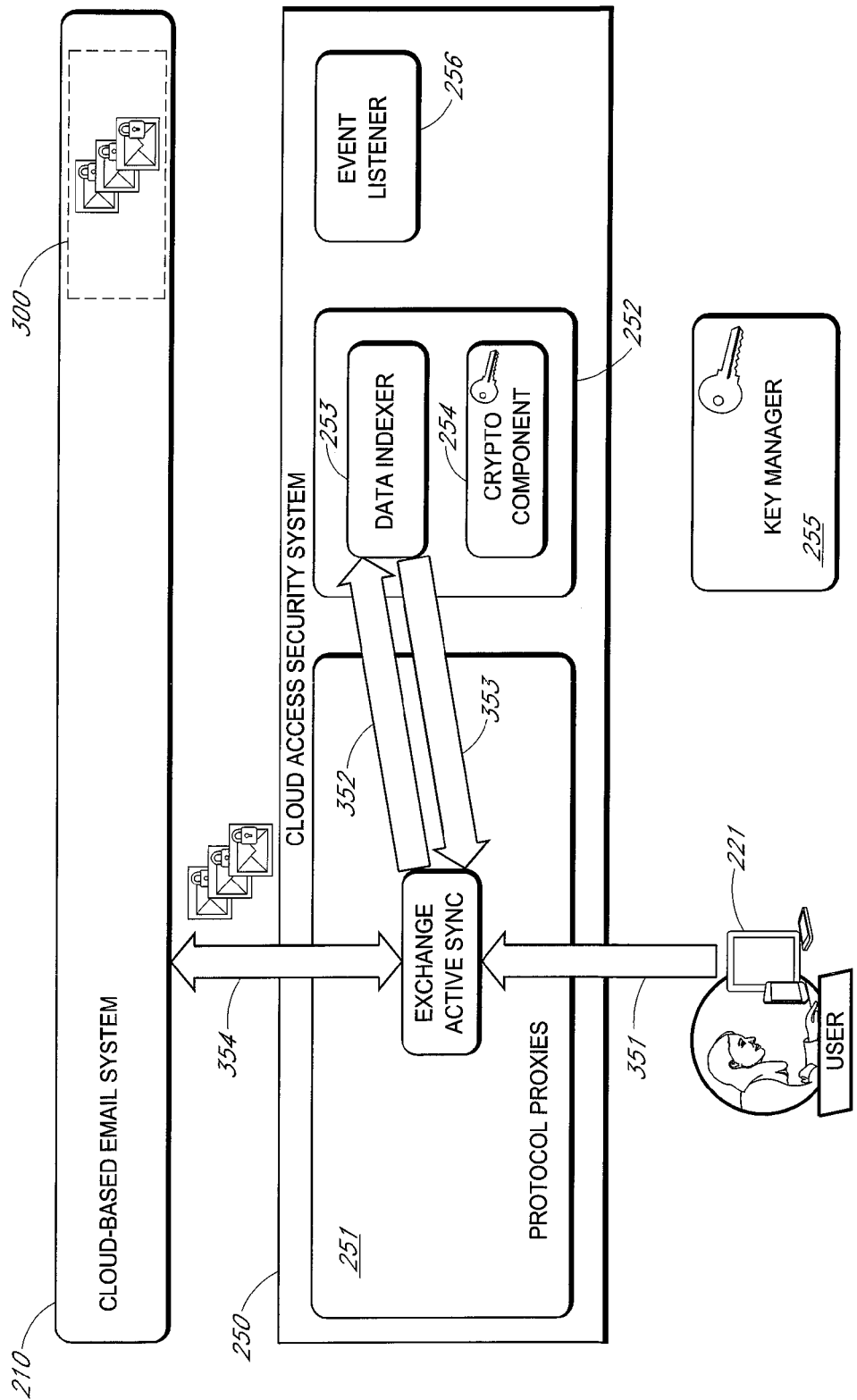
Figure 9:
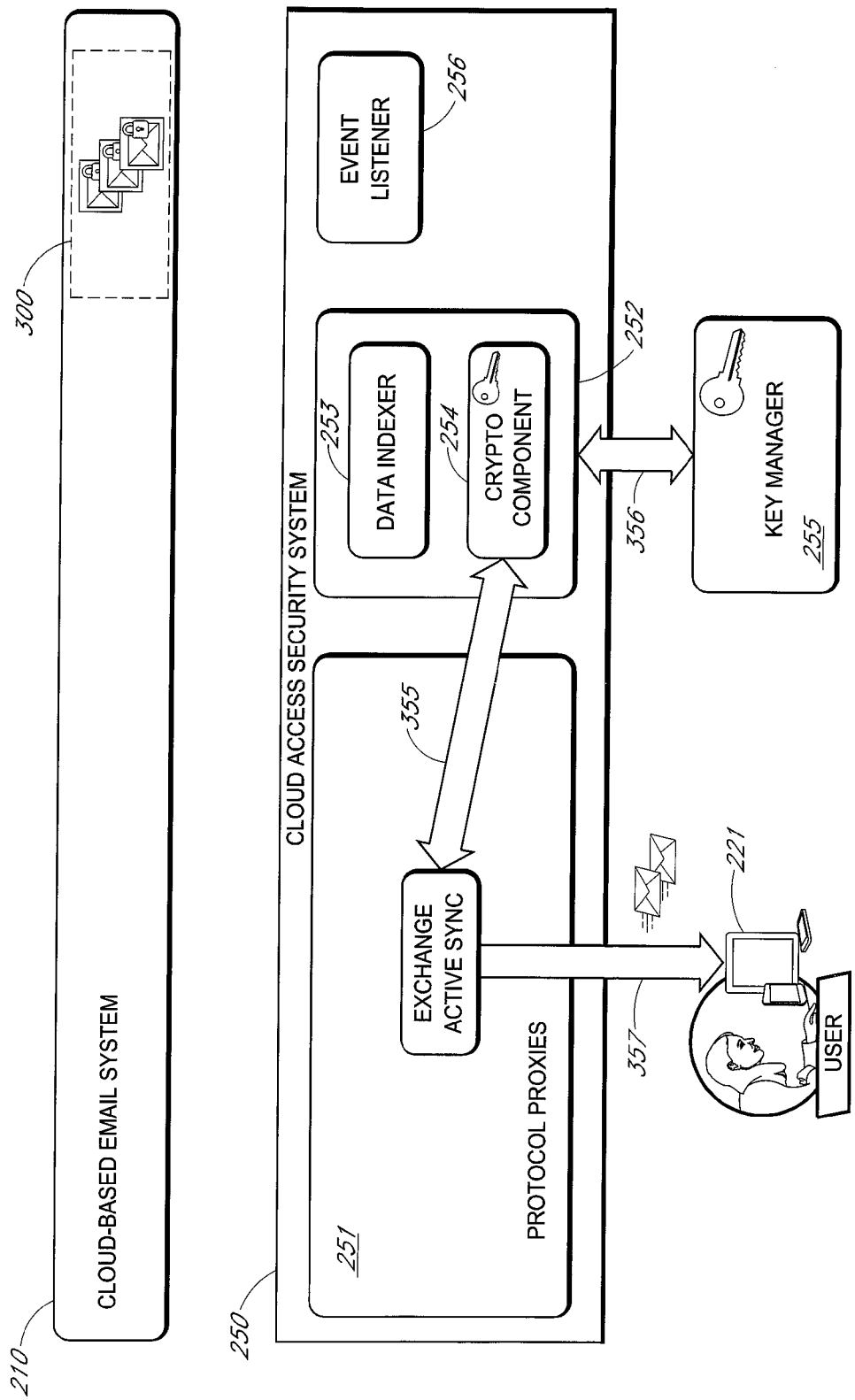

FIGS. 8 and 9 show a flow diagram that schematically illustrates searching a mailbox for one or more emails in accordance with an embodiment of the present invention. The flow diagram of FIGS. 8 and 9 may follow FIGS. 4-7 when the user of the client computer 221 searches the mailbox 300 for particular previously received incoming emails and/or particular previously sent outgoing emails, for example.

In the example of FIG. 8, the user of the client computer 221 is searching for particular emails that were previously received or sent by the user. Accordingly, the user may send an email search query to the cloud-based email system 210 using his client computer 221 (see arrow 351). The email search query may include search criteria specified by the user, such as keywords (e.g., particular texts in the message body or subject field) and/or parameters (e.g., sent by or received from a particular email address). The protocol proxy 251 receives the email search query from the client computer 221, determines from the email search query that the user is searching for emails, and sends a request to the data indexer 253 to identify emails in the mailbox 300 that meet the search criteria (see arrow 352). The data indexer 253 searches its index for encrypted emails in the mailbox 300 that meet the search criteria. The data indexer 253 identifies to the protocol proxy 251 the encrypted emails that meet the search criteria (see arrow 353). The protocol proxy 351 makes a request to the cloud-based email system 210 for the identified encrypted emails, and receives the identified encrypted emails from the cloud-based email system 210 (see arrow 354). Thereafter, as shown in FIG. 9, the protocol proxy 251 forwards the encrypted emails to the cryptography component 254 (see arrow 355), which decrypts the encrypted emails using associated encryption keys provided by the key manager 255 (see arrow 356). The cryptography component 254 provides the resulting, i.e., decrypted, emails to the protocol proxy 251 (see arrow 355). The protocol proxy 251 thereafter provides the emails to the client computer 221 (see arrow 357).

Figure 10:
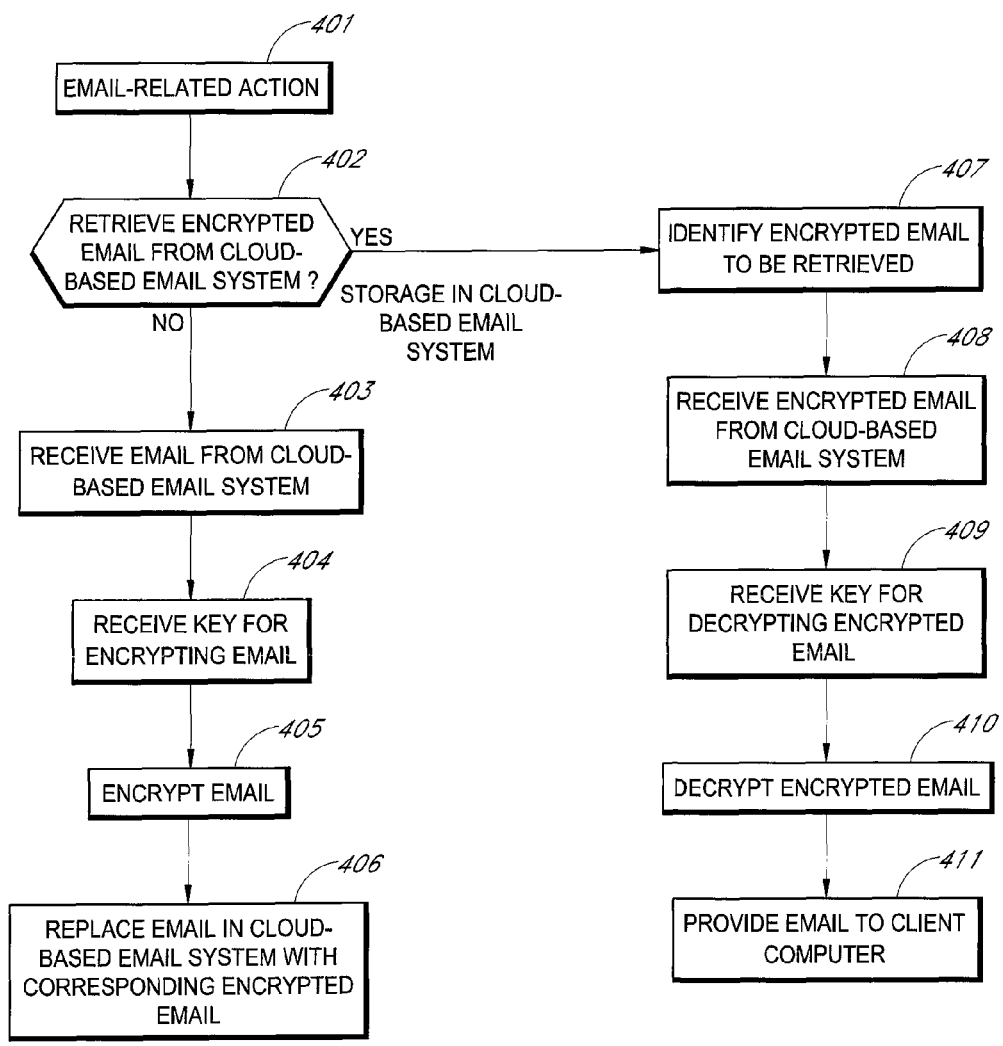
FIG. 10 shows a flow diagram of a method of securing emails stored in a cloud-based email system in accordance with an embodiment of the present invention.

FIG. 10 shows a flow diagram of a method of securing emails stored in a cloud-based email system in accordance with an embodiment of the present invention. The method of FIG. 10 is explained using components of the previously described system for securing cloud-based emails. It can be appreciated, however, that other components may also be employed without detracting from the merits of the present invention.

In the example of FIG. 10, the cloud access security system 250 performs an email-related action to secure emails in the cloud access security system 250 (step 401). The email-related action may involve encryption of an email and storage of the resulting encrypted email in the cloud-based email system 210 or retrieval of an encrypted email from the cloud-based email system 210, for example.

When the email-related action involves encryption of an email and storage of the resulting encrypted email in the cloud-based email system 210, the cloud access security system 250 receives the email from the cloud-based email system 210 (step 402 to step 403). This is the case when the cloud-based email system 210 receives an incoming email for the user or sends an outgoing email for the user, for example. As a particular example, the cloud access security system 250 may request the cloud access security system 250 for an incoming email or an outgoing email in response to receiving an email event notification. The cloud access security system 250 may receive an encryption key from the key manager 255 (step 404), and encrypt the email using the encryption key (step 405). The cloud access security system 250 replaces the email in the cloud-based email system 210 with a corresponding encrypted email (step 406).

When the email-related action involves retrieval of an encrypted email from the cloud-based email system 210, the cloud access security system 250 identifies the encrypted email to be retrieved (step 402 to step 407). For example, the email-related action may involve providing an encrypted incoming email to the client computer 221 of the user. As another example, the email-related action may involve providing the client computer 221 encrypted incoming and/or encrypted outgoing emails that are responsive to a search request. The cloud access security system 250 receives the encrypted email from the cloud-based email system 210 (step 408), receives from the key manager 255 an associated encryption key for decrypting the encrypted email (step 409), decrypts the encrypted email (step 410), and provides the resulting email to the client computer 221 (step 411).

Systems and methods for security emails in cloud-based email systems have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method for securing cloud-based emails, the method comprising:
   receiving in a cloud-based email system an incoming email for a user with a mailbox in the cloud-based email system;
   receiving the incoming email from the cloud-based email system;
   encrypting a text message in a body of the incoming email but not a header of the email to convert the incoming email to an encrypted incoming email;
   replacing the incoming email in the cloud-based email system with the encrypted incoming email;
   detecting a request from a client computer of the user to receive the incoming email; and
   in response to detecting the request from the client computer of the user to receive the incoming email, retrieving the encrypted incoming email from the cloud-based email system, decrypting the encrypted incoming email received from the cloud-based email system to convert the encrypted incoming email back to the incoming email, and providing the incoming email to the client computer.

2. The method of claim 1, further comprising:
   receiving a first notification from the cloud-based email system that the incoming email has been received in the cloud-based email system; and
   in response to receiving the first notification from the cloud-based email system, retrieving the incoming email from the cloud-based email system and replacing the incoming email in the cloud-based email system with the encrypted incoming email.

3. The method of claim 1, further comprising:
   receiving an encryption key from a key manager; and
   using the encryption key to encrypt the incoming email.

4. The method of claim 3, wherein the encryption key is received from the key manager hosted by a server computer in a same private computer network as the client computer.

5. The method of claim 1, further comprising:
   receiving a second notification sent by the cloud-based email system to the client computer that the incoming email has been received in the cloud-based email system; and
   forwarding the second notification to the client computer.

6. The method of claim 1, further comprising:
   after receiving the incoming email from the cloud-based email system but prior to encrypting the incoming email, indexing the incoming email in an index.

7. The method of claim 6, further comprising:
   receiving a search request from the client computer for emails that meet a search criteria;
   consulting the index to determine that the encrypted incoming email meets the search criteria;
   in response to detecting that the encrypted incoming email meets the search criteria, requesting the cloud-based email system for the encrypted incoming email;
   decrypting the encrypted incoming email received from the cloud-based email system to convert the encrypted incoming email back to the incoming email; and
   providing the incoming email to the client computer.

8. The method of claim 1, further comprising:
   receiving a third notification from the cloud-based email system that an outgoing email has been sent by the user; and
   in response to receiving the third notification, retrieving the outgoing email from the cloud-based email system, encrypting the outgoing email to an encrypted outgoing email, and replacing the outgoing email in the cloud-based email system with the encrypted outgoing email.

9. A system for securing cloud-based emails, the system comprising:
   a client computer employed by a user;
   a cloud-based email system where the user has a mailbox, the cloud-based email system being in communication with the client computer over a computer network; and
   a cloud access security system that receives over the computer network a first notification from the cloud-based email system that an incoming email for the user has been received in the cloud-based email system, receives the incoming email from the cloud-based email system, encrypts a text message in a body of the incoming email but not a header of the incoming email to an encrypted incoming email, replaces the incoming email in the cloud-based email system with the encrypted incoming email, retrieves the encrypted incoming email from the cloud-based system in response to detecting a request from the client computer to receive the incoming email, decrypts the encrypted incoming email received from the cloud-based email system back to the incoming email, and provides the incoming email to the client computer.

10. The system of claim 9, further comprising:
    a server computer with a key manager that provides an encryption key for encrypting the incoming email.

11. The system of claim 10, wherein the server computer is in a private computer network that includes the client computer.

12. The system of claim 10, wherein the server computer is part of the cloud access security system.

13. The system of claim 9, wherein the cloud access security system receives a second notification from the cloud-based email system that an outgoing email has been sent by the user, retrieves the outgoing email from the cloud-based email system in response to receiving the second notification, encrypts the outgoing email to an encrypted outgoing email, and replaces the outgoing email in the cloud-based email system with the encrypted outgoing email.

14. The system of claim 9, wherein the cloud access security system indexes the incoming email before encrypting the incoming email, detects that the client computer has sent a search request for emails that meet a certain criteria, consults the index to determine that the encrypted incoming email meets at least one of the criteria, retrieves the encrypted incoming email from the cloud-based email system, decrypts the encrypted incoming email received from the cloud-based email system back to the incoming email, and provides the incoming email to the client computer as a search result responsive to the search request.

15. A cloud access security system comprising one or more computers, the cloud access security system being operable to detect reception of an incoming email for a user with a mailbox in a remotely located cloud-based email system accessible by the cloud access security system over a computer network, retrieve the incoming email from the cloud-based email system, encrypt a text message of a body of the incoming email but not a header of the incoming email to generate an encrypted incoming email, and replace the incoming email in the cloud-based email system with the encrypted incoming email.

16. The cloud access security system of claim 15, wherein the cloud access security system is operable to retrieve the encrypted incoming email from the cloud access security system in response to detecting a request from a client computer of the user for the incoming email, decrypt the encrypted incoming email back to the incoming email, and provide the incoming email to the client computer.

17. The cloud access security system of claim 15, wherein the cloud access security system is operable to receive an outgoing email sent by the client computer to another computer, forward the outgoing email to the cloud-based email system for forwarding to the other computer, retrieve the outgoing email from the cloud-based email system, encrypt the outgoing email to generate an encrypted outgoing email, and replace the outgoing email stored in the cloud-based email system with the encrypted outgoing email.

18. The cloud access security system of claim 15, wherein the cloud access security system is operable to receive a search request for particular emails from the client computer, identify encrypted emails stored in the cloud-based email system and responsive to the search request, retrieve the identified encrypted emails from the cloud-based email system, decrypt the identified encrypted emails to generate decrypted emails, and provide the decrypted emails to the client computer as search results responsive to the search request.

19. The cloud access security system of claim 15, wherein the cloud access security system is operable to receive from a key manager an encryption key for encrypting the incoming email.

20. The cloud access security system of claim 19, wherein the cloud access security system is operable to receive the encryption key from the key manager that is in a same private computer network as a client computer employed by the user to send and receive emails to and from the cloud-based email system.

* * * * *